United States Patent
Yonezawa et al.

(10) Patent No.: US 9,331,502 B2
(45) Date of Patent: May 3, 2016

(54) CHARGE/DISCHARGE INSTRUCTION APPARATUS, CHARGE/DISCHARGE SYSTEM, CHARGE/DISCHARGE MANAGEMENT METHOD AND COMPUTER READABLE MEDIUM

(71) Applicant: KABUSHIKI KAISHA TOSHIBA, Minato-ku, Tokyo (JP)

(72) Inventors: Yuki Yonezawa, Kanagawa-ken (JP); Yasuyuki Nishibayashi, Kanagawa-ken (JP); Keiichi Teramoto, Tokyo (JP); Kotaro Ise, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 158 days.

(21) Appl. No.: 14/078,689

(22) Filed: Nov. 13, 2013

(65) Prior Publication Data

US 2014/0139188 A1    May 22, 2014

(30) Foreign Application Priority Data

Nov. 16, 2012    (JP) .................................. 2012-252525

(51) Int. Cl.
*H02J 7/00*    (2006.01)

(52) U.S. Cl.
CPC .............. *H02J 7/0021* (2013.01); *H02J 7/0022* (2013.01); *H02J 7/0077* (2013.01); *H02J 2007/0001* (2013.01); *H02J 2007/0098* (2013.01); *Y02T 10/7055* (2013.01)

(58) Field of Classification Search
CPC ... G06F 1/263; H01M 10/425; H01M 10/441; H01M 10/446; H01M 2010/4271; H01M 2220/20; H02J 7/0098; H02J 7/0021; H02J 7/0022; H02J 7/0047; H02J 7/0065; H02J 7/0077; Y02T 10/7055
USPC ....................................................... 320/134
See application file for complete search history.

(56) References Cited

U.S. PATENT DOCUMENTS 6,639,383 B2    10/2003    Nelson et al.
2013/0113277 A1*    5/2013    Kim et al. ...................... 307/9.1

FOREIGN PATENT DOCUMENTS

JP    2010-268602    11/2010

* cited by examiner

*Primary Examiner* — Vuthe Siek
(74) *Attorney, Agent, or Firm* — Amin, Turocy & Watson LLP; Gregory Turocy

(57) ABSTRACT

According to one embodiment, there is provided a charge/discharge instruction apparatus including: a communicating unit, a communication frequency deciding unit, an information collecting unit and a charge/discharge managing unit. The communicating unit communicates with a battery storage system. The communication frequency deciding unit decides a collection frequency of Information related to the battery storage system according to a state of the battery storage system. The information collecting unit collects the information from the battery storage system at the collection frequency decided in the communication frequency deciding unit. The charge/discharge managing unit controls at least one of charge and discharge of the battery storage system based on the information collected in the information collecting unit.

15 Claims, 11 Drawing Sheets

| CONFIGURATION EXAMPLE OF CHARGE/DISCHARGE CONTROL INFORMATION | |
|---|---|
| TARGET BATTERY STORAGE | BATTERY STORAGE SYSTEM 1 |
| CHARGE/DISCHARGE INFORMATION | SET COMPLETION/NOT SET |
| CHARGE/DISCHARGE CONTENT | CHARGE/DISCHARGE |

FIG. 6

| | HIGHER-ORDER CHARGE/DISCHARGE INSTRUCTION APPARATUS | GATEWAY CHARGE/DISCHARGE INSTRUCTION APPARATUS | LOWER-ORDER STORAGE SYSTEM | ACTION |
|---|---|---|---|---|
| CASE 1 | A | A | A | INCREASE COMMUNICATION FREQUENCY TO GRASP ACCURATE STATE |
| CASE 2 | A | B | A | INCREASE COMMUNICATION FREQUENCY TO GRASP ACCURATE STATE |
| CASE 3 | A | A | B | INCREASE FREQUENCY IF A IS AVAILABLE, OTHERWISE, DECREASE FREQUENCY |
| CASE 4 | A | B | C | INCREASE FREQUENCY IF A IS AVAILABLE, OTHERWISE, DECREASE FREQUENCY |

FIG. 10

CHARGE/DISCHARGE INSTRUCTION APPARATUS, CHARGE/DISCHARGE SYSTEM, CHARGE/DISCHARGE MANAGEMENT METHOD AND COMPUTER READABLE MEDIUM

CROSS REFERENCE TO RELATED APPLICATIONS

This application is based upon and claims the benefit of priority from the prior Japanese Patent Application No. 2012-252525 filed on Nov. 16, 2012, the entire contents of which are incorporated herein by reference.

FIELD

Embodiments described herein relates to a charge/discharge instruction apparatus, a charge/discharge system, a charge/discharge management method and a program.

BACKGROUND

There is known a system in which a plurality of battery storage systems are connected with an energy management system (i.e., charge/discharge instruction apparatus) that aggregates such battery storage systems. Given such a system, consider a large-scale system having a three-layer structure, in which a plurality of energy management systems (i.e., higher-order charge/discharge instruction apparatuses) are added as an upper layer for the charge/discharge instruction apparatus. In this case, the charge/discharge instruction apparatus functions as a gateway and the higher-order charge/discharge instruction apparatuses use the battery storage systems via the gateway.

To perform charge/discharge control using the battery storage systems by the gateway or the higher-order charge/discharge instruction apparatuses, the gateway needs to collect information of the battery storage systems. As a collection method, there is a method that the gateway communicates with each of the battery storage systems for a data read request and its response at any time. In this method, there may occur a problem of large volume of communicates, resulting in an increase in network load between the gateway and each battery storage system and lowered communication speed. As the number of battery storage systems as a lower layer for the gateway increases, this problem becomes serious. As another method, in a method in which a battery storage system reports information to a gateway by push-type communication, the similar problem may occur depending on the report frequency or the number of report Items.

BRIEF DESCRIPTION OF THE DRAWINGS

FIG. 6 is a view of charge/discharge control Information according to the present embodiment;

FIG. 10 is a view illustrating information related to owners/users of a higher-order charge/discharge instruction apparatus and gateway charge/discharge instruction apparatus and owners of a lower-order battery storage system.

DETAILED DESCRIPTION

According to one embodiment, there is provided a charge/discharge instruction apparatus including: a communicating unit, a communication frequency deciding unit an information collecting unit and a charge/discharge managing unit.

The communicating unit communicates with a battery storage system.

The communication frequency deciding unit decides a collection frequency of information related to the battery storage system according to a state of the battery storage system.

The information collecting unit collects the information from the battery storage system at the collection frequency decided in the communication frequency deciding unit.

The charge/discharge managing unit controls at least one of charge and discharge of the battery storage system based on the information collected in the information collecting unit.

Figure 1:
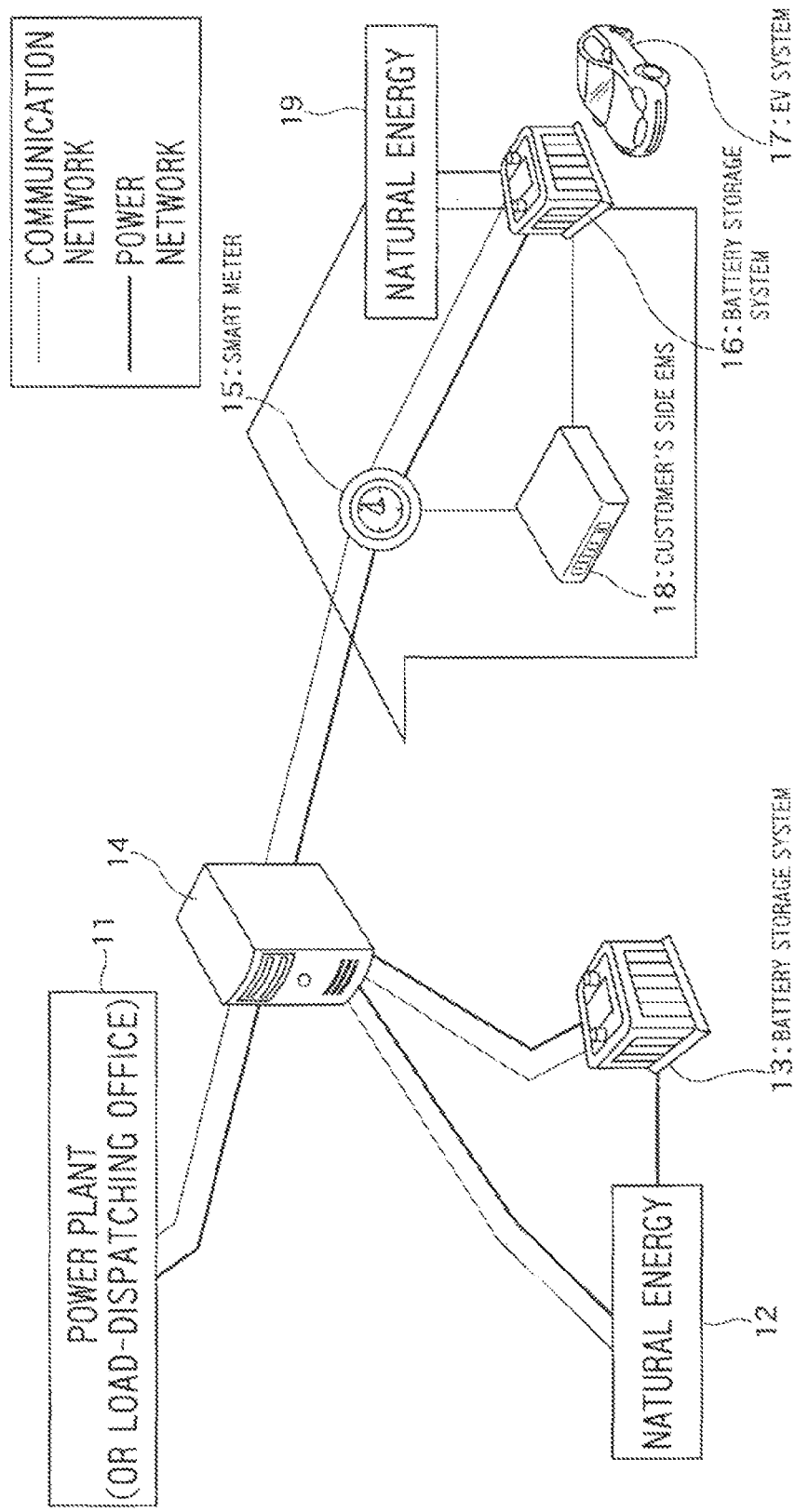
FIG. 1 is an overall view of a system according to the present embodiment.

Hereinafter, embodiments will be described with reference to the accompanying drawings, FIG. 1 presents the entire system according to the present embodiment.

In FIG. 1, on the power network side, there are provided a power plant (or load-dispatching office) 11, a natural energy system 12, a storage battery system (or higher-order storage battery system) 13 and a gateway charge/discharge instruction apparatus (or gateway apparatus) 14. The gateway charge/discharge instruction apparatus 14 corresponds to a storage battery SCADA (Supervisory Control and Data Acquisition). The gateway charge/discharge instruction apparatus 14 may have a function as an EMS (Energy Management System).

Also, on the customer side of a home or building, there are provided a smart meter 15, a storage battery system 16, an EV (Electric Vehicle) system 17, a customer's side EMS 18 and a natural energy system 19, As an EMS on the home customer side, there is an HEMS (Home Energy Management System). The storage battery system 16 and the EV (Electric Vehicle) system 17 correspond to an example of a lower-order storage, battery system arranged on the customer side. Here, although only one customer is illustrated, actually, there may be a number of customers.

The power plant (or load-dispatching office) 11 generates a large amount of power by fuel sources such as thermal power and nuclear power, and supplies it to the side of customers such as homes, buildings and factories through transmission and distribution networks. In the present specification, the transmission and distribution networks from the power plant 11 to the customers are collectively referred to as "power system network."

The natural energy system 12 generates power from energy existing in the natural world such as wind power and sunlight, and, in the same way as the power plant, supplies the power from the power system network to the customers through transmission and distribution networks. By installing the natural energy system 12 In the power system network, it is possible to reduce the burden in the power plant and efficiently perform an operation. Here, the high-order storage battery system 13 has a role to store surplus power generated in the power plant and the natural energy system.

The gateway charge/discharge instruction apparatus 14 has a role, to perform, control of stabilizing the whole power system including supply power of the power plant and the natural energy system and load power consumed on the customer side, using both a power network and a communication network. The power plant 11 corresponds to a high-order charge/discharge instruction apparatus for the gateway charge/discharge instruction apparatus 14. Here, only one high-order charge/discharge instruction apparatus is shown, but a plurality of high-order charge/discharge instruction apparatus may be arranged.

The smart meter 15 measures the electric energy consumed on the customer side premise and periodically reports it is a management server of an electric power provider. Generally, although the management server is referred to as "MOMS (Metering Data Management System)," its illustration is omitted in FIG. 1. The EMS as stated above can calculate the total amount of load power on the customer side in cooperation with the MDMS.

The storage battery system 16 installed in a customer's premise stores power supplied from the system network of the electric power provider or the natural energy system 25 on the premise.

The EV system 17 stores power in an in-vehicle battery through a battery charger The HEMS performs adjustment control of the consumption energy in the home. The EV system is one form of storage battery system.

In the example in FIG. 1, although the customer is in a standard home, a building and a factory are possible. In this case, instead of the home HEMS, a BENS (Building Energy Management System) in the building and a FENS (Factory Management System) in the factory take a role of performing adjustment control of the power consumption amount in the equipment.

As the use on the system side of the electric power provider in the storage battery system (e.g., the storage battery system 13 in FIG. 1), a storage battery system is utilized to realize a function called "ancillary service" (i.e. short-period control). The ancillary service stabilizes a system by performing output adjustment on a second time scale according to instantaneous load changes in order to maintain the electrical quality such as system frequency or voltage.

Also, as the use of the storage battery system on the home or building customer side, it may be utilized to realize a function called "peak shift" (i.e. day operation). The peak shift stores nighttime power of a lower unit price to implement interchange in a time zone in which the diurnal power use is peak.

Also, in one structure, a relationship of a controlling entity relative to a storage battery system may be a one-to-one relationship by operationally putting limitations. For example, the limitations are put on an electric power provider in the case of installment on the system side, and a home or building manager in the case of installment on the customer side, for example. In addition, on condition that a certain incentive is given on the customer side, it is possible to consider a structure of a many-to-many relationship that electric power providers perform charge/discharge control of storage battery systems installed on the customer sides. The present embodiment is directed to a case where a plurality of electric power providers perform charge/discharge control of storage battery systems installed on a plurality of customer sides as described above. However, the present embodiment is not limited to this, and can also be applied to a case where a single electric power provider performs charge/discharge control of these battery storage systems. Also, it is possible to employ a configuration in which a higher-order charge/discharge instruction apparatus is not provided and only a gateway charge/discharge instruction apparatus 14 having a function as an EMS is provided.

As a storage battery system on the customer side, the following two models are possible.

One is a storage battery model used as a stationary type. The other is a model of an EV system used as vehicle installation.

Figure 2:
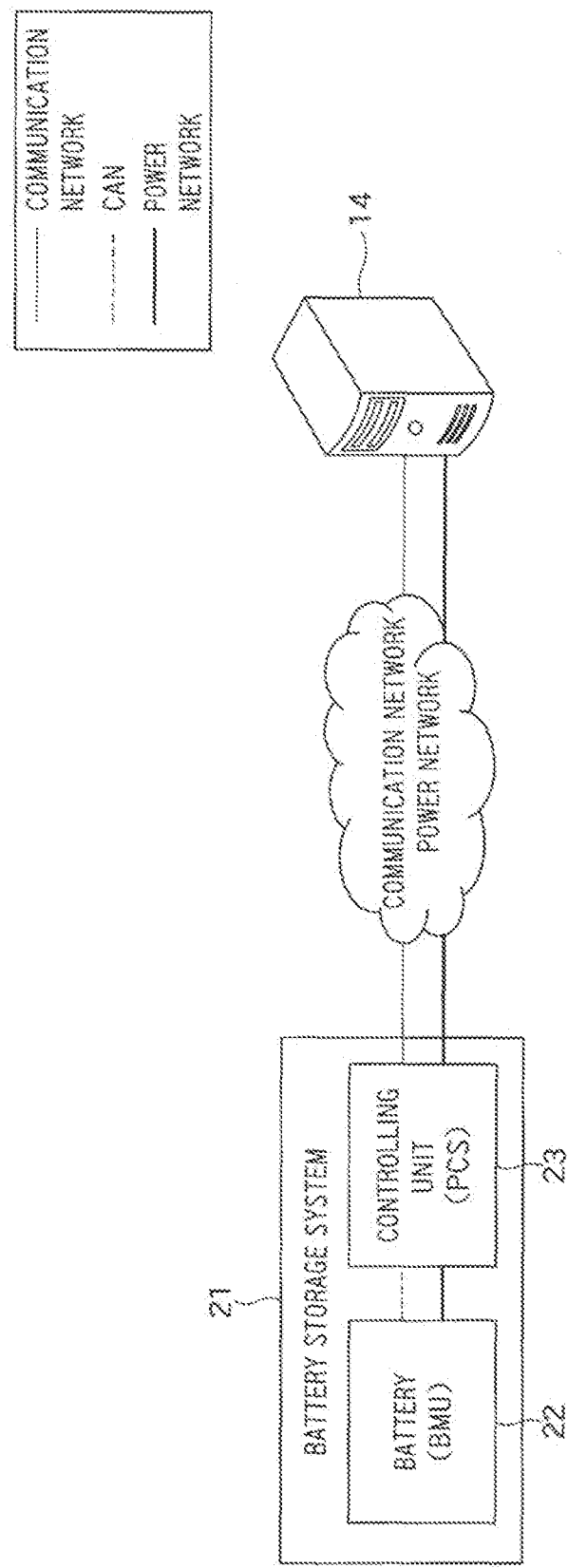
FIG. 2 is a view of a battery storage system according to the present embodiment.

FIG. 2 illustrates a storage battery system 21 as an example of a storage battery model The storage battery system 21 includes a BMU (Battery Management Unit) 22 and a controlling unit (or PCS (Power Conditioning System)) 23, The storage battery (BMU) 22 includes multiple battery cells and an internal processor to manage the state inside a battery pack, and executes charge/discharge control of power based on a request from the controlling unit (PCS) 23. The storage battery (BMU) 22 reports information such as the rated voltage, the maximum current value at the time of discharge and charge, the SOC (State Of Charge) and the SON (State Of Health) to the power electronics device 23. The controlling unit (PCS) performs direct-current/alternating-current conversion and voltage change suppression. Regarding procedures for the charge/discharge control and the information report between the storage battery (BMU) 22 and the power electronics device 23, there may be plural methods. The methods includes a method of realizing them using a CAN (Controller Area Network), and a method of realizing them using a communication medium such as Ethernet or an electrical signal line that is uniquely defined by a vendor who sells products. However, the embodiment is not limited to any communication unit.

The controlling, unit (PCS) 23 has a communication function and communicates with the EMS (gateway charge/discharge instruction apparatus) 14 installed in the power system network. Generally, since a storage battery has a feature of self-discharge, by acquiring information such as SOC and SOH from the storage battery system 21 via the communication network, the EMS 14 can appropriately monitor the state that changes over time and instruct charge/discharge control. Here, in the description, an input/output of power with respect to the storage battery 22 in the storage battery system 21. Is abbreviated and described as charge/discharge control with respect to the storage battery 22. Here, it is also conceivable that part or all of main functions of the controlling unit, such as a communication function, are realized on an external processor connected to a PCS.

Figure 3:
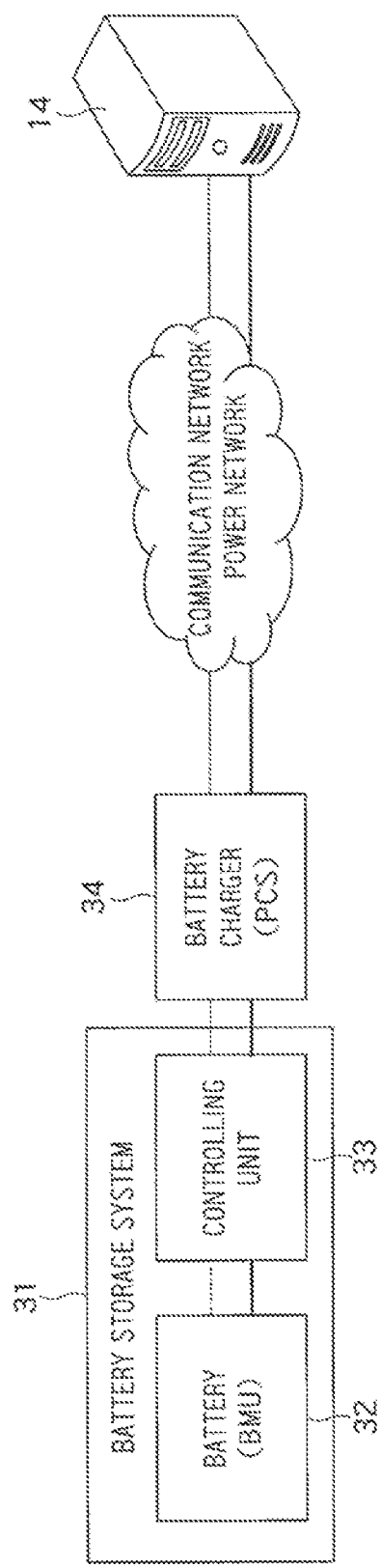
FIG. 3 is a view of an EV system (i.e. battery storage system) according to the present embodiment.

FIG. 3 illustrates an example of an EV system. An EV system 31 has a configuration similar to the storage battery system 21 in FIG. 2 but differs from it in that a battery charger (PCS) 34 is separately provided. A controlling unit 33 in the EV system 31 in FIG. 3 relays charge control and information report between a battery (BMU) 32 and a battery charger (PCS) 34, and does not mount a communication function to communicate with the EMS 14 on a power network. Instead, the battery charger 34 has main functions of the controlling unit 23 in the storage battery system in FIG. 2. That is, the EV system 31 in FIG. 3 has a feature that the main functions of the controlling unit 23 in the storage battery system 21 in FIG. 2 are moved to the battery charger 34.

A specific procedure to realize the first embodiment is common to the configurations as shown in FIG. 2 and FIG. 3, and, furthermore, the role of the controlling unit 33 in the EV system 31 can be defined to the same role as the controlling unit 23 of the storage battery system 21, Further, there are multiple formats as the installation destinations of algorithm processing related to discharge and charge with respect to the storage battery (BMU); the controlling unit, the battery charger and the HEMS/BEMS on a customer's premise or EMS in the power system network. The embodiment can be realized in the same framework even if any format is used.

Figure 4:
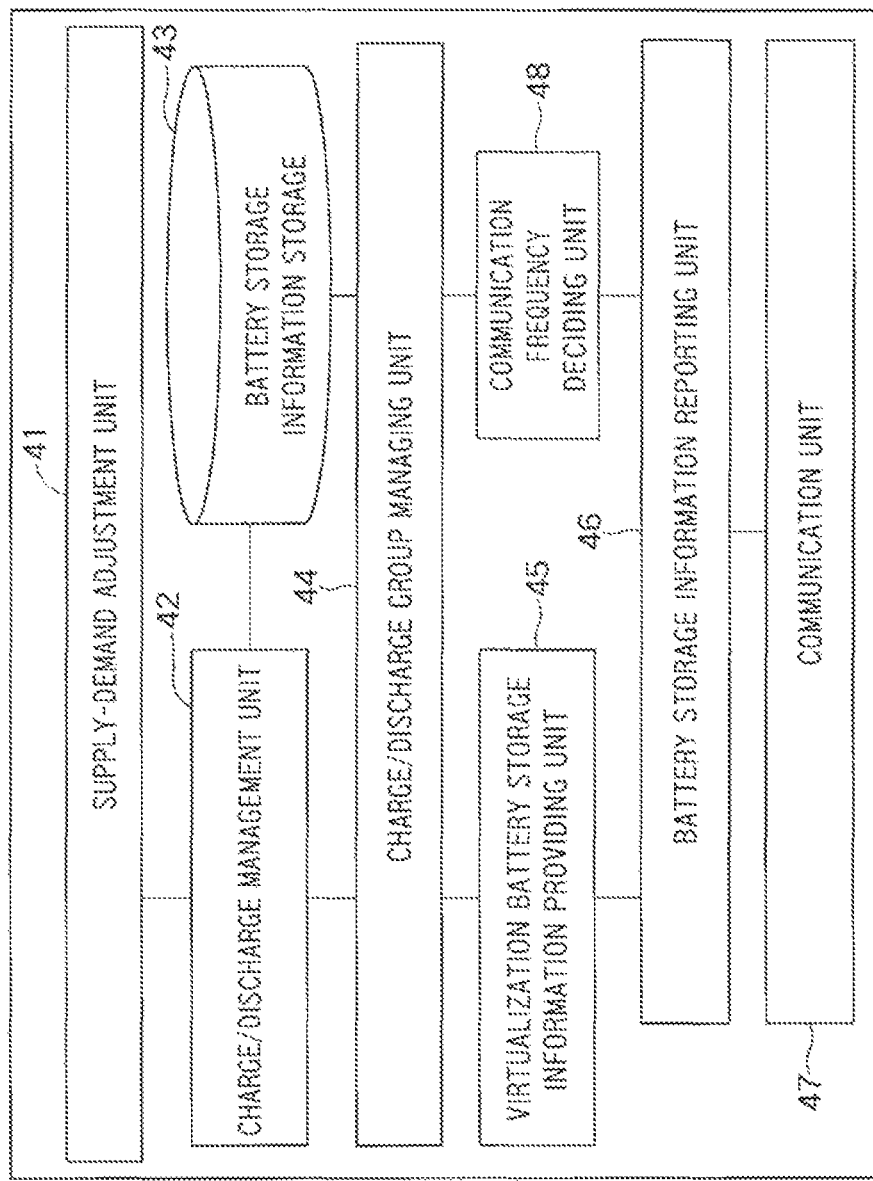
FIG. 4 is a view of a gateway charge/discharge Instruction apparatus according to the present embodiment.

FIG. 4 illustrates a gateway charge/discharge instruction apparatus according to the present embodiment.

The gateway charge/discharge instruction apparatus includes a supply-demand adjustment unit 41, a charge/discharge management unit 42, a battery storage information storage 43, a charge/discharge group managing unit 44, a visualization battery storage information providing unit 45, a communication frequency deciding unit 48, a battery storage information reporting unit (or information collecting unit) 46 and a communication unit 47.

A supply-demand adjustment unit 41 monitors the supply energy and a frequency state in a system network of an electric power provider or in equipment on the customer side. Also, the supply-demand adjustment unit 41 adequately makes a decision to: instruct charge/discharge control to a lower-order or higher-order storage battery system to prevent the blackout due to shortage of power supply; or instruct charge control to the lower-order or higher-order storage battery to use excess power caused by excess power supply later.

The charge/discharge management unit 42 manages the total charge/discharge amount of a virtual storage battery, which is a group acquired by grouping (described later) in the charge/discharge group managing unit 44, and performs control related to discharge and charge. The charge/discharge management unit 42 manages a plurality of groups (i.e. virtual storage batteries) and instructs charge/discharge control every group while monitoring the state of supply-demand adjustment.

A charge/discharge control instruction designates the discharge/charge amount to a storage battery operating as an on-demand type and designates the charge/discharge amount and a time period to a storage battery operating as a plan type, Such a control instruction is transmitted, as a communication message; from a storage battery information communication unit 46 to a communication unit 47. In this case, like IEC 61850 as the standard for electricity infrastructure related to distributed power-supply control, the standard for buildings and the standard for domestic or European and American homes, it is preferable to switch and use a different data model/communication protocol every application place and apply charge/discharge control according to each standard specification. However, in the embodiment herein, naturally, it is not limited to specification requirements of a particular standard.

Figure 5:
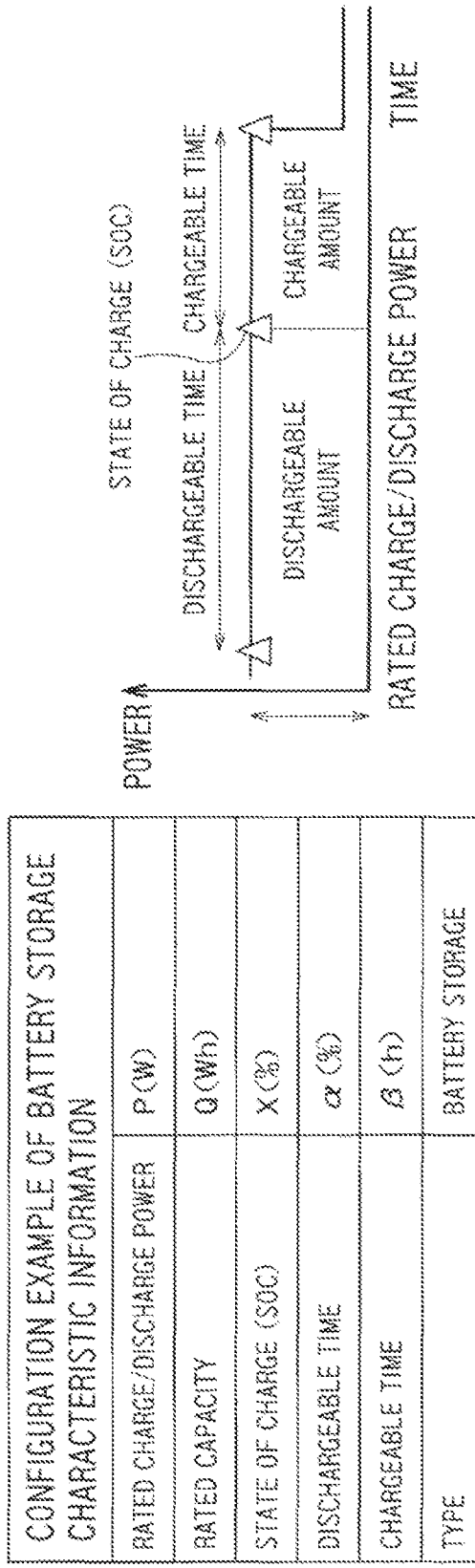
FIG. 5 is a view of battery storage characteristic Information according to the present embodiment.

The battery storage information storage 43 stores information such as battery storage specific information and utilization form information, as information required at the time of charge/discharge control of a battery unit (BMU). As battery storage specific information, there are battery storage characteristic information and charge/discharge control information. FIG. 5 illustrates a structure example of the battery storage characteristic information and FIG. 6 illustrates a structure example of the charge/discharge control information.

The example in FIG. 5 describes rated charge/discharge power expressed in W (Watt), rated capacity expressed in Wh (Watt hour), SOC (State Of Charge) expressed in percentage and dischargeable time and chargeable time associated with the SOC. In a constant current charge mode which is a general charge mode of a storage battery, the electric energy (i.e. current amount) input/output by battery ceils in the storage battery (BMU) is at a constant rate until the SOC expressed in percentage reaches a predetermined threshold.

In view of this, as illustrated in the right side of FIG. 5, by acquiring a value of the SOC from the storage battery (BMU), the gateway charge/discharge instruction apparatus can calculate the chargeable time and dischargeable time (i.e. the horizontal axis of the graph), the maximum charge/discharge power (i.e. the vertical axis of the graph) and the electric energy required for discharge and charge (i.e. product of the dischargeable and chargeable time and the power), which are associated with that information. In constant current charge, there is a feature that the current amount required for charge is substantially reduced after the SOC is over the predetermined threshold.

Also, as the electric energy at the time of charge/discharge control, it is possible to use the current amount, expressed in Ah (Ampere hour) and the voltage amount expressed in Vh (Volt hour) in addition to the electric energy expressed in Wh (Watt hour).

The charge/discharge control information in FIG. 6 is used to identify a charge/discharge operation state of a storage battery system. The "target storage battery" indicates identification information of the storage battery system. The "charge/discharge content" indicates which state of discharging, charging and others a storage battery is currently in. Also, the "charge/discharge content" may show whether to perform an on-demand operation to adequately transmit and receive a communication message related to a charge/discharge control instruction or perform a plan operation to set an operation timing schedule of charge/discharge control. The "charge/discharge information" indicates who is currently using (discharging or charging) a storage battery. In a case where the storage battery is used on the system side (e.g. higher-order charge/discharge instruction apparatus), "set completion" is illustrated, and, in a case where the storage battery is used by the customer or charge/discharge is not performed, "not set" is illustrated.

As the utilization form information, there are a use time period of a day (e.g. a time period in which a customer plans to mainly use a battery storage) and information of an owner of a lower-order battery storage system. In addition, the utilization form information may include information of a specific time period in which the battery storage can be used only by an owner of a lower-order battery storage system and which cannot be used by a charge/discharge instruction apparatus.

For example, in the use time period, it is possible to use it as an index of frequency change in a case where a real-time measurement of high accuracy is requested to be performed in a specific time period in which the electricity is tight or where a measurement of rough granularity is sufficient in a time period In which the electricity is not tight. It is possible to use owner information of a battery storage system as an index to change the communication frequency depending on who owns the battery storage system. As the owner, various subjects are possible such as a customer and an electric power company (e.g. a user/owner of a higher-order charge/discharge instruction apparatus or a user/owner of a gateway charge/discharge instruction apparatus).

The charge/discharge group managing unit 44 groups and manages connected lower-order storage battery systems. Regarding a higher-order charge/discharge instruction apparatus, one or more storage battery systems as all or part of plural storage battery systems can be selected and combined to illustrate one virtual storage battery (or storage battery group). The charge/discharge group managing unit 44 creates at least one virtual storage battery based on storage battery systems that are not being used by customers, for example. According to the customer usage state, a used storage battery system may be changed every time zone. Also, a group may be created based on storage battery systems that are not being charged or discharged. The charge/discharge group managing unit 44 creates the virtual storage battery in an arbitrary manner and assigns it to a higher-order charge/discharge instruction apparatus. The higher-order charge/discharge apparatus may not know information of individual storage battery systems in the group and may know the overall characteristic of the individual storage battery systems.

Also, the charge/discharge group managing unit 44 converts an order (e.g. plan information or a control order), which is transmitted from the higher-order charge/discharge Instruction apparatus to the virtual storage battery, into control orders for the individual lower-order storage battery systems. Subsequently, the converted control order for each storage battery system is transmitted to the charge/discharge management unit 42, the storage battery information storage 43 and the communication frequency deciding unit 48 to execute control of the virtual storage battery.

Figure 7:
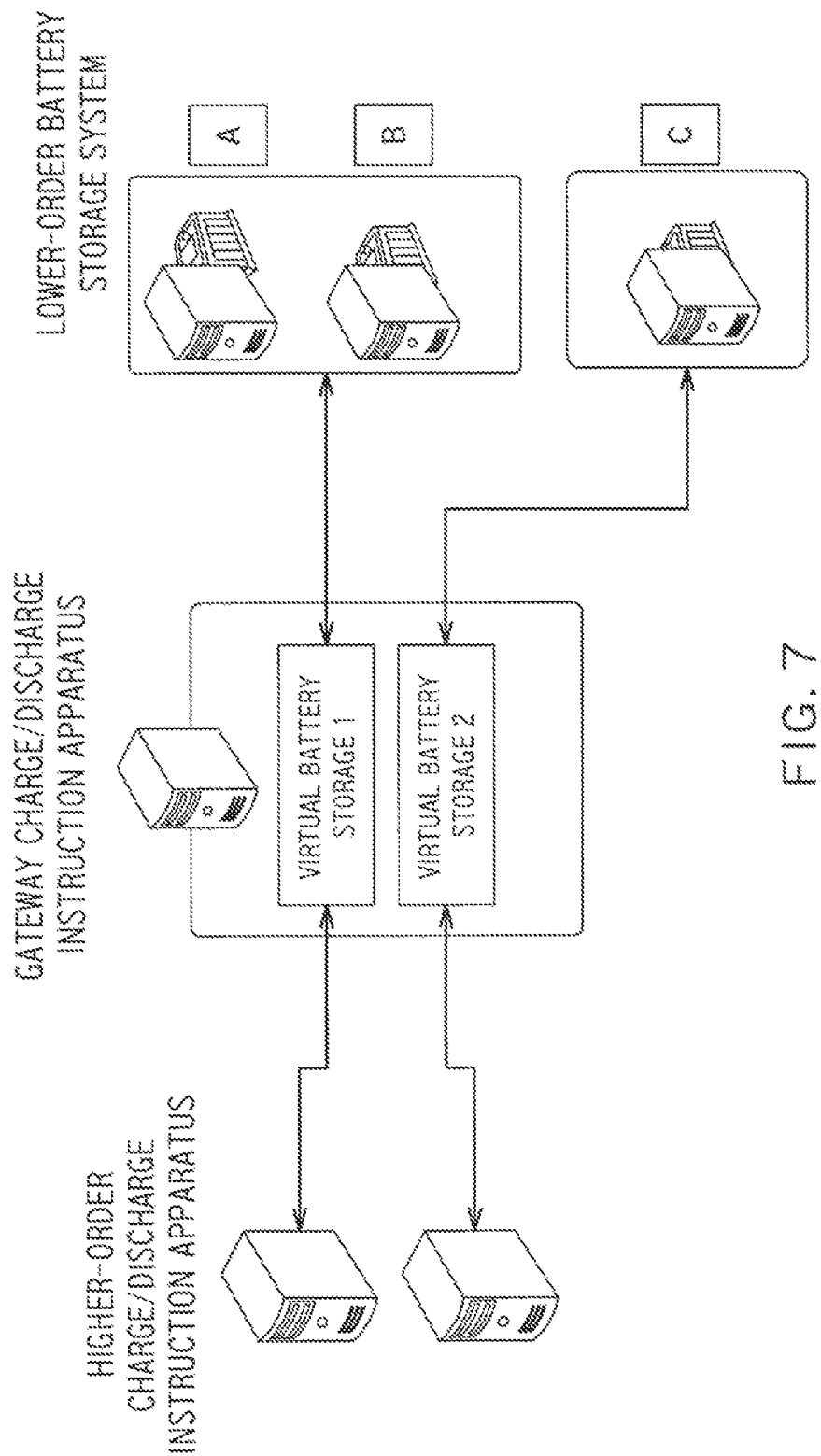
FIG. 7 is a view illustrating details of a virtual battery storage.

FIG. 7 illustrates details of virtual storage batteries (i.e. groups).

In the present embodiment, virtual storage batteries 1 and 2 target storage battery systems that do not overlap at all in a physical manner. Further, in a case where there are a plurality of higher-order charge/discharge instruction apparatuses, the virtual storage batteries the storage battery systems of which do not overlap in a physical manner are assigned to them. By this means, since exclusive processing of control orders between the virtual storage batteries is not required, it becomes easy to simplify a system.

Based on a result of grouping by the charge/discharge group managing unit 44, a visualization storage battery information providing unit 45 aggregates a plurality of lower-order storage battery systems as a virtual storage battery and provides characteristic information and interface of the virtual storage battery to a higher-order charge/discharge instruction apparatus. The information shown for the higher-order charge/discharge instruction apparatus is given to the storage battery information communication unit 46. For generation of the characteristic information of the virtual storage battery, it is possible that various calculations are required. For example, there may be a method of calculating accurate data from electricity information of the grouped lower-order storage batteries and a method of calculating the power capacity that can be reliably provided by the virtual storage battery. Also, taking into account owner information of a lower-order battery storage system acquired from the battery storage information storage 43, there is a possible method of calculating a power output that can be supplied even in a time period in which it is not possible to use the lower-order battery storage system. The higher-order charge/discharge instruction apparatus regards the virtual storage battery as one storage battery. A plurality of virtual storage batteries may be previously generated and characteristic information and interfaces of all of these virtual storage batteries may be presented to the higher-order charge/discharge instruction apparatuses. The charge/discharge group managing unit 44 receives designation of a virtual storage battery desired to be assigned, from the higher-order charge/discharge instruction apparatus, and assigns the designated virtual storage battery. Alternatively, in response to a characteristic condition (e.g. power capacity) of a storage battery requested from the higher-order charge/discharge instruction apparatus, it may be possible to combine lower-order storage battery systems so as to satisfy the condition to thereby generate a virtual storage battery and assign the generated virtual storage battery. The storage battery information communication unit 47 is used to receive a communication message related to electric energy Information and access control of a battery unit (BMU) required for charge/discharge control, on a communication network via the communication unit 47. Regarding a communication message, like IEC 61850 as the standard for electricity infrastructure related to distributed power-supply control, the standard for buildings and the standard for domestic or European and American homes, it is preferable to switch and use a different data model/communication protocol every application place. However, in the embodiment herein, naturally, it is not limited to specification requirements of a particular standard.

The communication unit 47 can be realized by a wireless communication medium in addition to a wire communication medium such as an optical fiber, telephone line and Ethernet. However, the communication unit 47 in the embodiment herein does not depend on a specific communication medium, After receiving permission decision in access control from a lower-order storage battery system, a gateway charge/discharge instruction apparatus generates and transmits a communication message related to charge/discharge control. In such a control procedure between the gateway charge/discharge instruction apparatus and the lower-order storage battery system, although it may be possible to improve the safety by applying an authentication procedure, the embodiment herein does not depend on a specific form.

The gateway charge/discharge instruction apparatus operating as an EMS manages a plurality of groups which are virtual storage batteries. The gateway charge/discharge instruction apparatus instructs charge/discharge control every group while monitoring the state of supply-demand adjustment. A charge/discharge control instruction designates the discharge/charge amount to a storage battery operating as an on-demand type and designates the charge/discharge amount and a time period to a storage battery operating as a plan type. In the case of transmitting such a control instruction as a communication message via the storage battery information communication unit 46, like IEC 61850 as the standard for electricity infrastructure related to distributed power-supply control, the standard for buildings and the standard for domestic or European and American homes, it is preferable to switch and use a different data model/communication protocol every application place and apply charge/discharge control according to each standard specification. However, in the embodiment herein, naturally, it is not limited to specification requirements of a particular standard.

The communication frequency deciding unit 48 determines the collection frequency of information related to a lower-order battery storage system (hereinafter referred to as "communication frequency"), depending on a state of the lower-order battery storage system. To be more specific, the communication frequency deciding unit 48 dynamically changes a data item to communicate with a lower-order battery storage system and dynamically changes the communication frequency. Therefore, battery storage specific information (e.g. battery storage characteristic information or charge/discharge control information) and utilization form information are used. The communication frequency deciding unit 48 sets the collection frequency (i.e. communication frequency) every communication data item. As the communication data item, although there are two data items of a data item transmitted from a gateway charge/discharge instruction apparatus and a data item transmitted from a lower-order battery storage system, the present embodiment focuses on the latter. The communication frequency deciding unit 48 is described later in detail.

Figure 8:
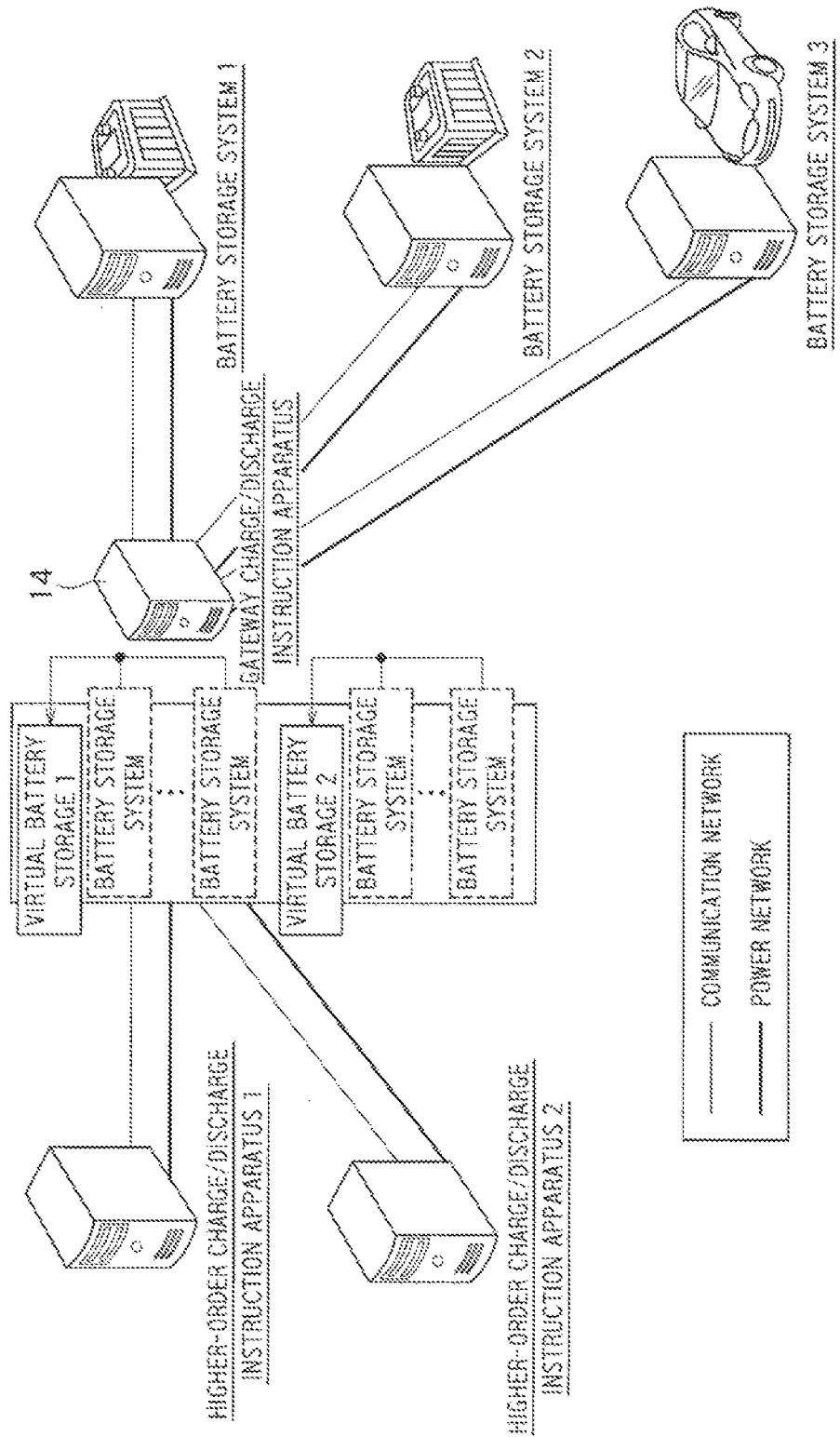
FIG. 8 is an overall view of a charge/discharge system including higher-order charge/discharge instruction apparatuses, gateway charge/discharge instruction apparatus and battery storage systems according to the present embodiment.

Using FIG. 8, an example of a use case assumed by the present embodiment is explained. FIG. 8 illustrates a charge/discharge system according to the present embodiment. A structure of the charge/discharge system includes three layers of: higher-order charge/discharge instruction apparatuses 1 and 2; the gateway charge/discharge instruction apparatus 14; and battery storage systems (i.e. lower-order battery storage systems) 1, 2 and 3 on the customer side.

Each of the higher-order charge/discharge instruction apparatuses 1 and 2 communicates with the gateway charge/discharge instruction apparatus 14. The gateway charge/discharge instruction apparatus 14 performs communication between each of the higher-order charge/discharge instruction apparatuses 1 and 2 and the battery storage systems 1, 2 and 3. The battery storage systems 1, 2 and 3 perform communication with the gateway charge/discharge instruction apparatus 14.

The gateway charge/discharge instruction apparatus 14 controls a plurality of battery storage systems based on instructions received from the higher-order charge/discharge Instruction apparatuses 1 and 2 (or charge/discharge instructions of virtual storage batteries). For example, respective instructions are transmitted from the higher-order charge/discharge instruction apparatuses 1 and 2 to the gateway charge/discharge instruction apparatus, For example, a day-time operation order (including, for example, information of a time period charge/discharge and charge/discharge amounts) related to plan information and individual charge/discharge instructions (including, for example, designation of real-time charge/discharge amounts) are provided.

The gateway charge/discharge instruction apparatus performs each distribution calculation based on orders received from the higher-order charge/discharge instruction apparatuses 1 and 2. For example, it specifically calculates: from which battery storage system the discharge is performed; and to which equipment (e.g. a battery storage system on the system side/battery storage systems of other customers/power consumption apparatus) the discharge is directed, and calculates: in which battery storage system the charge is performed; from which equipment (e.g. power plant/battery storage system on the system side/battery storage systems of other customers) the charge is performed; and how much charge is stored.

For example, a control order for the battery storage system 2 is generated and transmitted according to a distribution calculation result with respect to the higher-order charge/discharge instruction apparatus 1, and control orders for the battery storage systems 1 and 3 are generated and transmitted according to a distribution calculation result with respect to the higher-order charge instruction apparatus 2.

Here, as a communication message from the higher-order charge/discharge instruction apparatus to the gateway charge/discharge instruction apparatus, the following messages are conceivable. The first one is to perform on-demand control, and, for example, controls a battery storage system in real time to prevent the instantaneous interruption of power supply in a power network. The second one is to perform planned control. For example, it is possible to allow the setting to execute control of a battery storage system at relatively rough time intervals in the night time period, and can be used for a plan operation.

Figure 9:
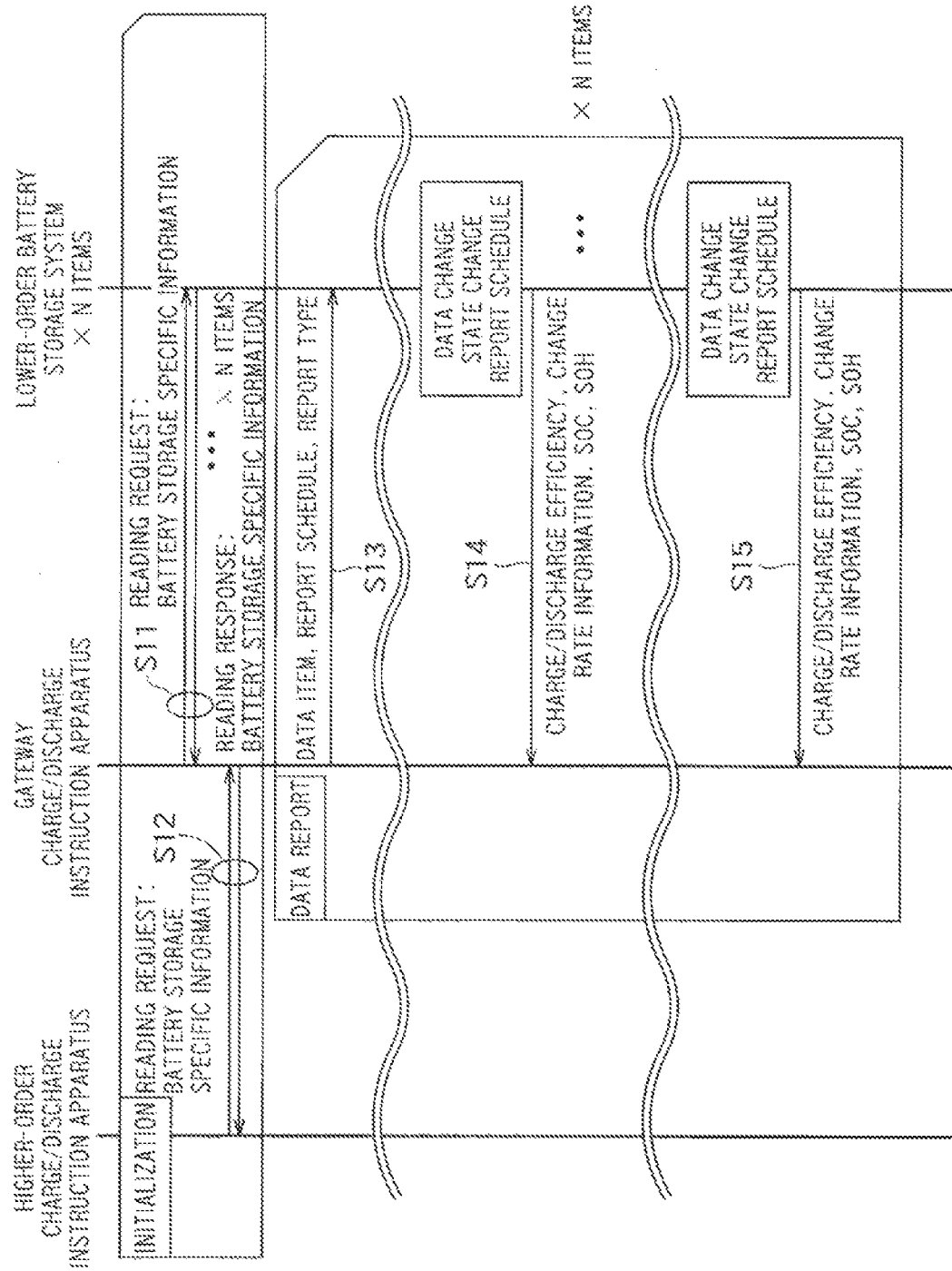
FIG. 9 is a view of an operation sequence between three layers of a higher-order charge/discharge instruction apparatus, gateway charge/discharge instruction apparatus and lower-order battery storage systems.

FIG. 9 illustrates an operation sequence between three layers of a higher-order charge/discharge instruction apparatus, gateway charge/discharge instruction apparatus and lower-order battery storage systems.

The higher-order charge/discharge instruction apparatus performs communication with the gateway charge/discharge instruction apparatus. The gateway charge/discharge instruction apparatus performs communication with the higher-order charge/discharge instruction apparatus and the battery storage systems.

A communication operation phase includes two operations: an initial operation and a normal operation.

In the initial operation, two kinds of processing are performed, where the gateway charge/discharge instruction apparatus performs processing of connecting to N battery storage systems of management targets and the higher-order charge/discharge instruction apparatus performs processing of connecting to the gateway charge/discharge instruction apparatus. The gateway charge/discharge instruction apparatus acquires the initial battery storage specific information (see FIG. 5 and FIG. 8) from the lower-order battery storage systems (S11). Here, the above-mentioned utilization form information may be acquired at the same time. The gateway charge/discharge instruction apparatus transmits battery storage information based on the information acquired from the lower-order battery storage systems, to the higher-order charge/discharge instruction apparatus (S12). To be more specific, it transmits information of a virtual battery storage grouping the lower-order battery storage systems, or the battery storage specific information of each battery storage system. Here, an explanation is continued with an assumption that the information of the virtual battery storage is transmitted. Also, the virtual battery storage information may be acquired at a later arbitrary timing instead of the initial operation. The higher-order charge/discharge instruction apparatus transmits a control order or schedule information with respect to the visualization battery storage, based on the visualization battery storage information received from the gateway charge/discharge instruction apparatus. The gateway charge/discharge instruction apparatus performs control of the battery storage systems based on the control order or schedule information received from the higher-order charge/discharge instruction apparatus.

Information related to the lower-order battery storage systems is required to control the lower-order battery storage systems. The gateway charge/discharge instruction apparatus presents a virtualization battery storage combining one or more storage batteries to the higher-order charge/discharge Instruction apparatus and therefore requires the information related to the lower-order battery storage systems. Since the battery storage system has a feature that the value varies over time, it is necessary to manage the operation state in real time and collect information of the lower-order battery storage system at adequate frequency. To collect data, following two methods are conceivable.

The first method is a collection method by making an Inquiry from the gateway charge/discharge instruction apparatus to each battery storage system. When the real-time characteristic is pursued, it leads to a problem that a load of the gateway charge/discharge instruction apparatus itself or a load on a network increases. Naturally, depending on the number of communication items, a load on the network increases.

The second method is a method of performing a report from the lower-order battery storage system to the gateway charge/discharge instruction apparatus. By this method, although an inquiry from the gateway charge/discharge instruction apparatus is not made, there arises the same problem that a network load increases depending on the number of communication items.

In any method, since real-time data is transmitted and received, there is a problem that the communication frequency between the gateway charge/discharge instruction apparatus and the lower-order battery storage system becomes significant and the communication quality degrades. The present embodiment suppresses degradation of the communication quality and realizes efficient data communication between the gateway charge/discharge instruction apparatus and the lower-order battery storage system.

In FIG. 9, the gateway charge/discharge instruction apparatus transmits communication information on data items, a report schedule (i.e. a schedule to transmit the data items) and a report type (the above first method or the above second method is designated) to the lower-order battery storage system (S13). The lower-order battery storage system transmits data items according to the instruction from the gateway charge/discharge instruction apparatus (S14 and S15). In the illustrated example, a case is provided where values of the charge/discharge efficiency, change rate information, SOC and SOH are transmitted as the data items.

To be more specific, to report the current status, the lower-order battery storage system transmits the battery storage characteristic information illustrated in FIG. 5, the charge/discharge control information illustrated in FIG. 6 and data defined in IEC 61850 or other international standards, to the gateway charge/discharge instruction apparatus. Utilization form information may be transmitted. Regarding the data items transmitted by the lower-order battery storage system and the transmission frequency (e.g. transmission intervals), the gateway charge/discharge instruction apparatus givens an instruction to the lower-order battery storage system in advance or during the operation. With these systems, the present embodiment dynamically changes the communication frequency every data item using the characteristic of each communication data item and the use time period and owner information of the lower-order battery storage system. As a frequency change example, for example, a transmission interval is lengthened or shortened. As another example, in a case where a data item is transmitted only when a specific event occurs, transmission every event occurrence may be changed to transmission every multiple event occurrences. Naturally, other examples are possible.

As a data item type, regarding rated charge/discharge power and rated capacity (see FIG. 5), they have hardly been changed since a battery storage device was manufactured. Therefore, if may be decided that these items of information are set only by one communication at the time of the initial operation.

Also, while charge is performed, it is possible to predict a length of time required to compete the charge, from the current charging rate or information held in the lower-order battery storage system, and therefore it may be possible set the frequency such that data item communication stops until the prediction timing of the charge completion and data item transmission starts from the prediction timing.

Meanwhile, the charging rate (i.e., percentage of charging) during discharge and the dischargeable time depend on a use state of the user using power of the lower-order battery storage system. Therefore, to recognize the charging rate during discharge and the dischargeable time, it is necessary to correctly monitor the lower-order battery storage system. Thus, regarding an item predicted to be often changed under conditions to execute discharge, it is considered that it is necessary to increase the communication frequency and maintain the real-time characteristic.

The communication frequency is determined using information of the user time period and owner/user of the lower-order battery storage system as utilization form information.

As a determination example of the communication frequency using the use time period, the communication frequency is increased in a time period with high electricity demand within the customer's use time period. On the other hand, the communication frequency is decreased in another time period with low electricity demand like midnight, and rough measurement is performed. By this means, it is possible to perform measurement at required granularity according to a time period of a day.

As the owner/user information, there are the owner of the lower-order battery storage system, the owner/user of the gateway charge/discharge instruction apparatus that gives a charge/discharge instruction to the lower-order battery storage system, and the owner/user of the higher-order charge/discharge instruction apparatus that executes control from the gateway charge/discharge instruction apparatus. The user of the gateway charge/discharge instruction apparatus or higher-order charge/discharge instruction apparatus may be the owner of the gateway charge/discharge instruction apparatus or higher-order charge/discharge instruction apparatus, or may be a person who borrows it from the owner Here, although the lower-order battery storage systems are grouped by the gateway charge/discharge instruction apparatus, lower-order battery storage systems belonging to the same group may be systems of completely different persons and associations or organizations.

Also, as another determination example of communication frequency, a specific time period is freely used by the owner of a lower-order battery storage system and others than the specific time period can be used as a public property by other users. In such a case, in the time period that is freely used by the owner of the lower-order battery storage system, it is conceivable to decrease the frequency in order to prevent the communication traffic from increasing. Meanwhile, in order for the gateway charge/discharge instruction apparatus to immediately use the lower-order battery storage system in the available time period, it is conceivable to increase the communication frequency as the available time (i.e., a start time of the available time period) is closer so as to acquire the accurate state of the lower-order battery storage system.

Also, at the time of recognizing the state of the lower-order battery storage system, by limiting communication data items depending on the purpose, it is possible to decrease the traffic between the gateway charge/discharge instruction apparatus and the lower-order battery storage system.

FIG. 10 illustrates four cases of a list of the users/owners of the higher-order charge/discharge instruction apparatus and gateway charge/discharge instruction apparatus and the owner of the lower-order battery storage system.

In cases 1 and 2 in FIG. 10, the owner of the lower-order battery storage system and the user/owner of the higher-order charge/discharge instruction apparatus which is the source of a control order are the same. To grasp the accurate state, it is conceivable to increase the communication frequency. The communication frequency and data times may be determined depending on other factors than the owner.

Cases 3 and 4 denote cases where the user/owner of the higher-order charge/discharge instruction apparatus and the owner of the lower-order battery storage system are different.

For example, in case 3, the lower-order battery storage system owned by B is used by user/owner A of the higher-order charge/discharge instruction apparatus. In cases 3 and 4, one or both of the communication frequency and communication data items are changed depending on whether it is a time period in which the owner of the lower-order battery storage system a Hews to use the lower-order battery storage system or whether the lower-order battery storage system is in an available state (e.g. whether it is being used by the owner of the lower-order battery storage system).

In FIG. 10, although it is illustrated that "the higher-order charge/discharge instruction apparatus, the gateway charge/discharge instruction apparatus and the lower-order battery storage system" are in "1:1:1 correspondence," combinations such as "n:1:n" and "1:1:n" are also possible. Therefore, it is necessary to change the communication frequency and data items based on information of the owner and user of the lower-order battery storage system every combination.

Figure 11:
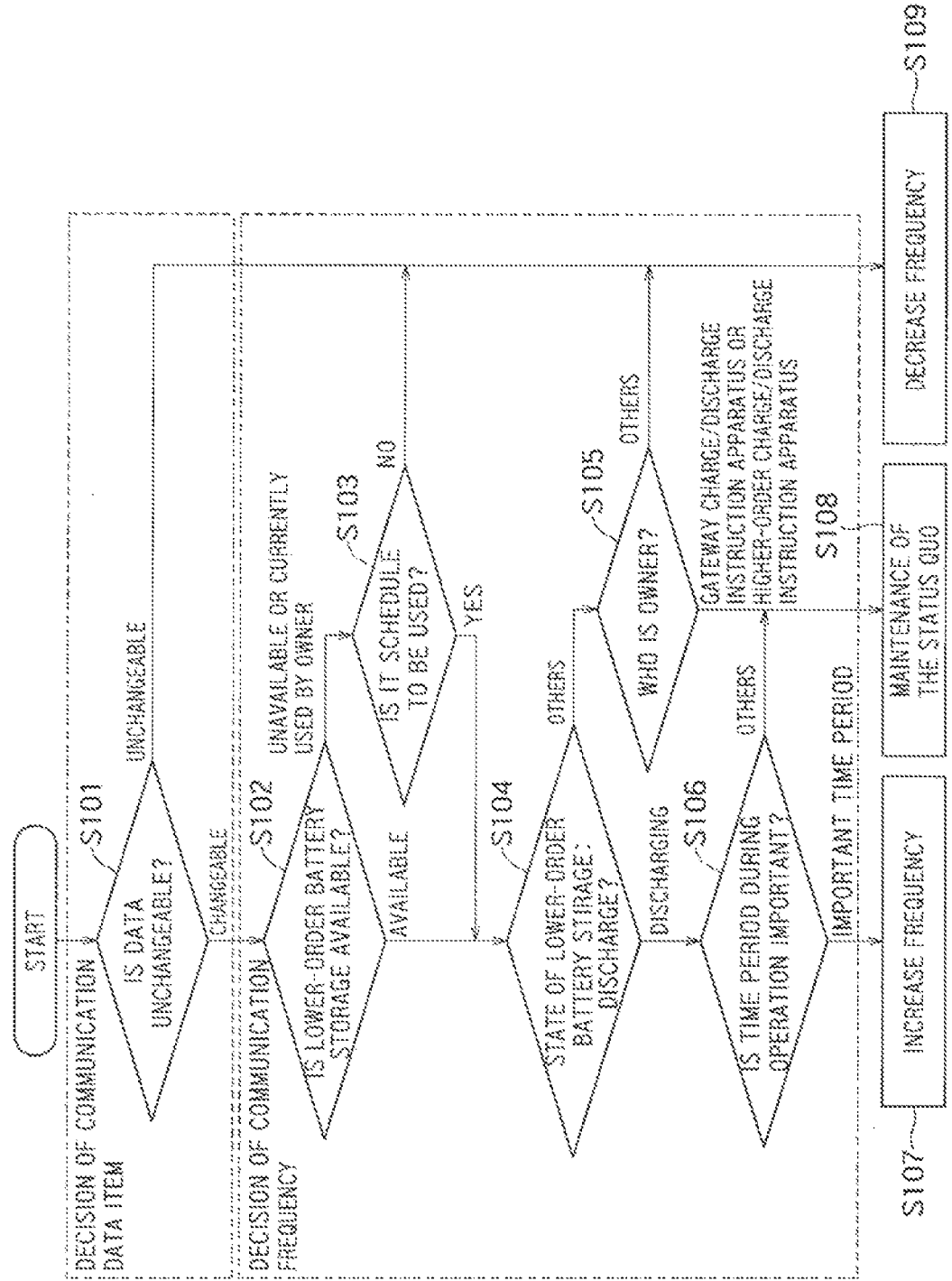
FIG. 11 is a sequence view illustrating an example of decision of communication frequency and decision of communication data items.

FIG. 11 illustrates an example of an operation sequence of the communication frequency deciding unit 48 according to the present embodiment. The present sequence is executed every data item, for example. Activation of the present sequence may be performed at regular time intervals, at the time a specific event occurs or at the timing determined by an arbitrary algorithm.

The present sequence can be divided into two: communication data item decision and communication frequency decision. In the communication data item decision, it is decided whether a data item is unchangeable (S101). In a case where the data item has an unchangeable value, the communication frequency is set to a predetermined low value or the communication frequency is set to a value subtracting a certain value from the current value (S109). Otherwise, it shifts to a communication frequency decision sequence. As an example of an unchangeable value, rated capacity and rated charge/discharge power are possible.

In the communication frequency decision, first, it is decided whether the lower-order battery storage system is in a currently available state (S102). For example, when the lower-order battery storage system is currently used by the owner of the lower-order battery storage system, the current time is not included in an available time period or the owner of the lower-order battery storage system sets it such that it cannot be used, it is decided that it is not available. When it is not in an available state, next, it is decided whether it is scheduled to be used later, for example, it is decided whether it Is scheduled to be used within a certain period of time (S103). If there is no such schedule, the communication frequency is set to a first value (e.g. low value) or the current frequency is set to a value decreased by a certain value (S109). Meanwhile, if the lower-order battery storage system is available, it is decided whether a state of the lower-order battery storage system is discharging (S104).

If it is discharging, it is decided whether the current operation time period is included in a time period with high electricity demand (S106). If it is included in such a time period, the communication frequency is set to a second value (which is a value higher than the first value) or a value adding a certain value to the current frequency (S107). If it is not included in such a time period. It is set to a third value between the first value and the second value, or the current frequency is maintained (S108).

Meanwhile, when it is not discharging, it is decided who is the owner of the lower-order battery storage system (S105). If the owner is a customer, the communication frequency is set to the above first value (i.e. low value) or the current frequency is decreased (S109). If the owner of the lower-order battery storage system matches the user/owner of the gateway charge/discharge instruction apparatus or higher-order charge/discharge instruction apparatus, the communication frequency is set to the above third value or the current frequency is maintained (S108).

In the above, sequence, in a case where it branches from steps S101, S103 and S105 to step S109, although each communication frequency is set to the first value (i.e. low value) or the current communication frequency is decreased, the first value may vary in each branch or the decreased value may vary. The same applies to a case where it branches from steps S105 and S106 to step S108.

In a case where the frequency is increased or decreased in step S107 or S109 in the sequence of FIG. 11, the upper limit value or lower limit value may be determined in advance and a change over the value may not be made.

The above is just a specific example and it is conceivable that a method of making a decision from a past history is applied as a decision method of communication data items and communication frequency, or items set at the time of initialization setting are applied, or items determined according to statistics are applied. Also, there may be a case where there is an interface to acquire information of communication data items and communication frequency from the lower-order battery storage itself.

Thus, according to the present embodiment, by changing data items and communication frequency based on information related to a charge/discharge state, operation time period or owner/user of a battery storage system, it is possible to suppress an increase of a network band and efficiently obtain information of the lower-order battery storage system. Further, it is possible to realize a large-scale system in which a set of a number of storage batteries is handled as one logical virtual battery storage.

The gateway charge/discharge instruction apparatus which have been heretofore described may also be realized using a general-purpose computer device as basic hardware. That is, each unit in the apparatus can be realized by causing a processor mounted in the above described computer device to execute a program. In this case, the apparatus may be realized by installing the above described program in the computer device beforehand or may be realized by storing the program in a storage medium such as a CD-ROM or distributing the above described program over a network and installing this program in the computer device as appropriate. Furthermore, the storage in the apparatus may also be realized using a memory device or hard disk incorporated in or externally added to the above described computer device or a storage medium such as CD-R, CD-RW, DVD-RAN, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A charge/discharge instruction apparatus comprising a computer including a processor, the computer being configured to control the charge/discharge instruction apparatus to perform operations, comprising:

communicating with a battery storage system;

deciding a collection frequency being a time interval at which information related to the battery storage system is to be collected from the battery storage system, according to a state of the battery storage system;

collecting the information from the battery storage system at the collection frequency decided in a communication frequency deciding unit; and controlling at least one of charge and discharge of the battery storage system based on the information collected in an information collecting unit.

2. The charge/discharge instruction apparatus according to claim 1, wherein the computer is configured to control the charge/discharge instruction apparatus to perform further operations, comprising:

deciding the collection frequency based on whether the battery storage system is discharging.

3. The charge/discharge instruction apparatus according to claim 1, wherein the computer is configured to control the charge/discharge instruction apparatus to perform further operations, comprising:

deciding the collection frequency based on whether the battery storage system is charging.

4. The charge/discharge instruction apparatus according to claim 1, wherein the computer is configured to control the charge/discharge instruction apparatus to perform further operations, comprising:

deciding the collection frequency based on whether the battery storage system is being used by a customer.

5. The charge/discharge instruction apparatus according to claim 1, wherein the computer is configured to control the charge/discharge instruction apparatus to perform further operations, comprising:

deciding the collection frequency according to a time period in which the information is collected.

6. The charge/discharge instruction apparatus according to claim 5, wherein the computer is configured to control the charge/discharge instruction apparatus to perform further operations, comprising:

deciding the collection frequency based on whether the time period is included in a specific time period of a day.

7. The charge/discharge instruction apparatus according to claim 1, wherein the collection frequency is a collection frequency at which the information is collected during a time period in which the battery storage system is discharging according to an instruction of the charge/discharge managing unit, and the computer is configured to control the charge/discharge instruction apparatus to perform further operations, comprising:

deciding the collection frequency according to a time period of a day in which the discharge is performed.

8. The charge/discharge instruction apparatus according to claim 7, wherein the computer is configured to control the charge/discharge instruction apparatus to perform further operations, comprising:

deciding the collection frequency based on whether the time period is included in a specific time period of a day.

9. The charge/discharge instruction apparatus according to claim 1, wherein the computer is configured to control the charge/discharge instruction apparatus to perform further operations, comprising:

deciding the collection frequency based on whether an owner of the battery storage system matches a user or owner of the charge/discharge instruction apparatus.

10. The charge/discharge instruction apparatus according to claim 1, wherein the computer is configured to control the charge/discharge instruction apparatus to perform further operations, comprising:

deciding the collection frequency based on a type of the information to be collected.

11. The charge/discharge instruction apparatus according to claim 1, wherein:

the battery storage system can be controlled by the charge/discharge managing unit only in a specific time period of a day; and the computer is configured to control the charge/discharge instruction apparatus to perform further operations, comprising:

increasing the collection frequency as a start time of the specific time period is closer.

12. The charge/discharge instruction apparatus according to claim 1, wherein the computer is configured to control the charge/discharge instruction apparatus to perform further operations, comprising:

providing battery storage information based on the information collected by the information collecting unit, to a higher-order charge/discharge instruction apparatus;

controlling battery storage system based on an instruction from the higher-order charge/discharge instruction apparatus; and deciding the collection frequency based on whether an owner of the battery storage system matches a user or owner of the higher-order charge/discharge instruction apparatus.

13. A charge/discharge system, comprising:

a storage battery system; and a charging/discharging instruction apparatus comprising a computer including a processor, the computer being configured to control a charging/discharging instruction apparatus to perform operations, comprising:

communicating with the battery storage system, deciding a collection frequency being a time interval at which information related to the battery storage system is to be collected from the battery storage system, according to a state of the battery storage system, collecting the information from the battery storage system at the collection frequency decided in a communication frequency deciding unit, and controlling at least one of charge and discharge of the battery storage system based on the information collected in an information collecting unit.

14. A charge/discharge management method implemented by a computer including a processor, the method comprising:

communicating, by the computer,. with a battery storage system to obtain a state of the battery storage system, deciding, by the computer, a collection frequency being a time interval at which of information related to the battery storage system is to be collected from the battery storage system, according to the state of the battery storage system, collecting, by the computer, the information from the battery storage system at the collection frequency as decided, and controlling, by the computer, at least one of charge and discharge of the battery storage system based on the information as collected.

15. A non-transitory computer readable medium, having instructions stored therein which causes, when executed by a processor, to perform processing of steps comprising:

communicating with a battery storage system to obtain a state of the battery storage system,
deciding a collection frequency being a time interval at which information related to the battery storage system is to be collected from the battery storage system, according to the state of the battery storage system,
collecting the information from the battery storage system at the collection frequency as decided, and
controlling at least one of charge and discharge of the battery storage system based on the information as collected.

* * * * *